United States Patent [19]

Miyazawa

[11] Patent Number: 5,214,520
[45] Date of Patent: May 25, 1993

[54] IMAGE DATA READING APPARATUS

[75] Inventor: Hideyuki Miyazawa, Machida, Japan

[73] Assignee: Ricoh Comany, Ltd., Tokyo, Japan

[21] Appl. No.: 617,809

[22] Filed: Nov. 26, 1990

[30] Foreign Application Priority Data

Nov. 27, 1989 [JP] Japan ............................ 1-308355

[51] Int. Cl.⁵ .................................................. H04N 1/40
[52] U.S. Cl. ............................... 358/461; 358/443; 358/464
[58] Field of Search ............ 358/461, 464, 475, 488, 358/401, 443, 471, 474, 496

[56] References Cited

U.S. PATENT DOCUMENTS

| | | | |
|---|---|---|---|
| 4,870,501 | 9/1989 | Yoshida | 358/461 |
| 4,876,605 | 10/1989 | Ishikawa et al. | 358/443 |
| 4,916,549 | 4/1990 | Sekizawa | 358/461 |
| 5,038,225 | 8/1991 | Maeshima | 358/461 |

FOREIGN PATENT DOCUMENTS 55-61170 5/1980 Japan .
57-73572 5/1982 Japan ................................... 358/461

Primary Examiner—Edward L. Coles, Sr.
Assistant Examiner—Thomas D. Lee
Attorney, Agent, or Firm—Oblon, Spivak, McClelland, Maier & Neustadt

[57] ABSTRACT

An image data reading apparatus is provided, comprising a transport part for transporting an original sheet to a reading position within the image data reading apparatus, a white reference plate provided at the reading position, a light source for generating a light projected to the reading position, a light receiving part for converting an incoming light reflected from the white reference plate into a white reference signal and for converting an incoming light reflected from the original sheet into an image signal, a correction part for eliminating a shading from the image signal based on a reference voltage, a peak level holding part for detecting and storing a peak level of a corrected signal from the correction part, a quantization part for converting an incoming signal from the correction part into digital information based on the peak level, and a switching part for turning the peak level holding part off to stop detection and storing of the peak level of the incoming signal for a prescribed time period between a time the white reference signal is received by the light receiving part from the white reference plate and at a time the original sheet is transported to the reading position, so that the peak level holding part receives no signal from the light receiving part during the prescribed time period.

5 Claims, 3 Drawing Sheets

POINT "a"

POINT "b"

POINT "c"

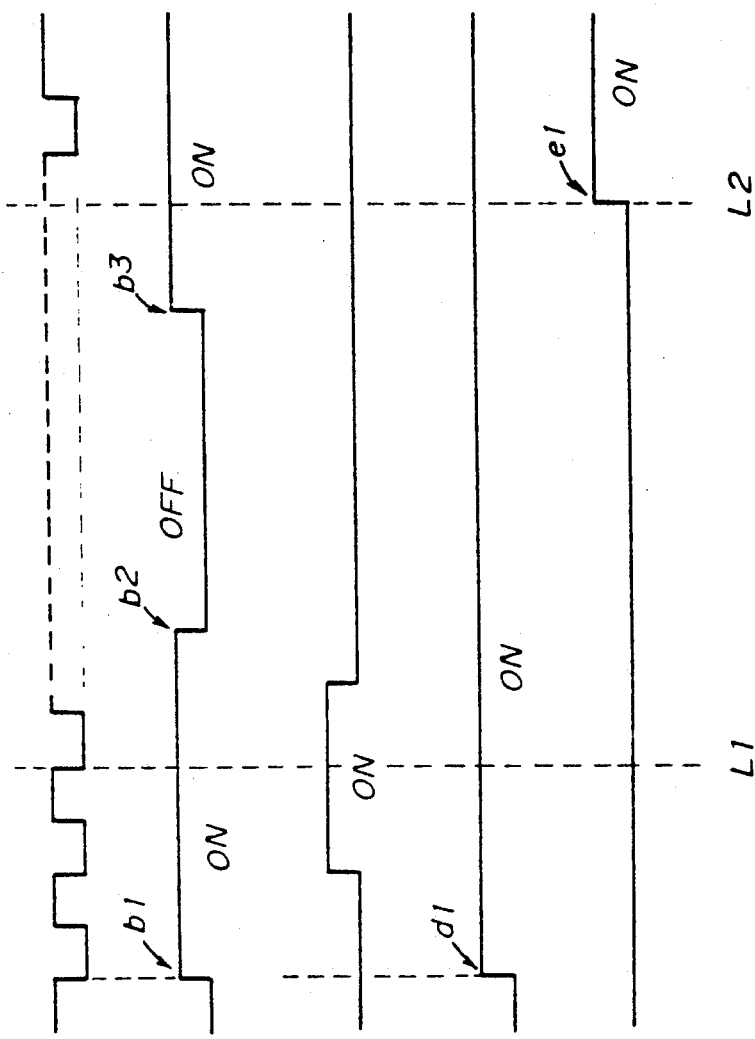

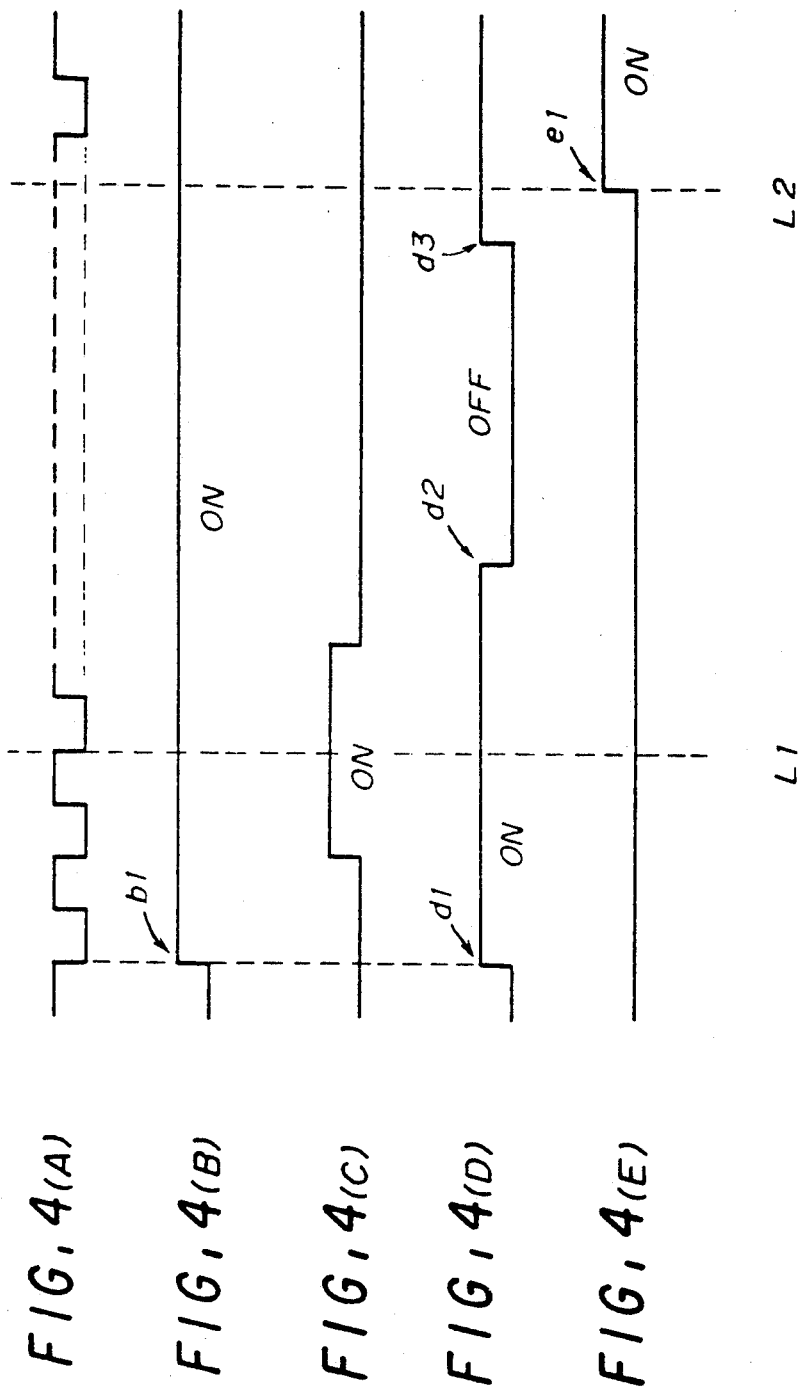

IMAGE DATA READING APPARATUS

BACKGROUND OF THE INVENTION

The present invention generally relates to image data reading apparatus, and more particularly to an image data reading apparatus which uses the peak level of an image signal as a reference voltage for a quantization part to convert the image signal into digital information.

Conventionally, an image data reading apparatus projects a light from a light source to a surface of an original sheet carrying image information for reading the image information, and a reflected light from the original sheet surface is photoelectrically converted into an analog signal indicative of the image information. And, undesired shading is eliminated from this analog signal by a correction circuit of the image data reading apparatus. This corrected analog signal from which the undesired shading is eliminated is quantized into digital information (usually binary code) by a quantization circuit of the image data reading apparatus, and this digital information is outputted from the image data reading apparatus to an image forming unit.

Such a conventional image data reading apparatus is disclosed, for example, in Japanese Laid-Open Patent Application No. 55-61170. In a case of this conventional image data reading apparatus, before a leading edge of an original sheet reaches a reading position within the image data reading apparatus, a white reference signal obtained from a light reflected back from a white reference plate is detected and stored within the image data reading apparatus. As the original sheet is transported to the reading position, such a white reference signal previously stored is used as a reference level for the correction circuit to eliminate undesired shading from an image signal obtained from a reflected light from the original sheet carrying image information. After the image signal is thus corrected, a peak level of the image signal is detected and stored by a peak level holding circuit of the image data reading apparatus, and this peak level stored is used as a reference level for a quantization circuit to convert the image signal into digital information. In addition, the peak level holding circuit always performs, even after the white reference signal is received by the light receiving part, a detection and holding of a peak level of the image signal until an image signal processing is completed with the reflected light from the original sheet.

However, due to the shape of a leading edge of the original sheet transported along the transport path, a light from the light source is sometimes regularly reflected back from the original sheet, and this regularly reflected light is received by the light receiving part. The peak level of output signal from the light receiving part in such a case is unusually high, and the peak level holding circuit detects and stores such a very high peak level of the output signal from light receiving part, because the peak level holding circuit is continuously in operation. The peak level of the output signal in this case is much higher than an ordinary peak level of the output signal which is obtained from a background region within the original sheet. Based on such a very high peak level of the output signal which is used as a reference level, the quantization circuit converts an image signal into digital information. If an image is reproduced from this digital information, the resulting image would be very dark as a whole, and therefore it is difficult to quantize accurately an image signal into digital information, the quantization being carried out based on the reference level which is unusually high due to regular reflection of light at a leading edge of an original sheet.

SUMMARY OF THE INVENTION

Accordingly, it is a general object of the present invention to provide an improved image data reading apparatus in which the above described problems are eliminated.

Another and more specific object of the present invention is to provide an image data reading apparatus which comprises a transport part for transporting an original sheet along a transport path to a first position within the image data reading apparatus, the original sheet carrying image information on a front surface thereof, a white reference plate provided at the first position on an opposite side of the front surface of the original sheet, a light source for generating a light being projected to the first position where the original sheet is transported along the transport path, a light receiving part for photoelectrically converting a first incoming light reflected from the white reference plate into a white reference signal, and for photoelectrically converting a second incoming light reflected from the original sheet into an image signal, a correction part for eliminating a shading from an incoming signal from the light receiving part to the correction part, based on the white reference signal which is supplied from the light receiving part before the original sheet is transported to the first position, a peak level holding part for detecting and storing a peak level of an incoming signal from the light receiving part to the peak level holding part through the correction part, a quantization part for converting an incoming signal from the light receiving part into digital information based on the peak level of the image signal detected and stored by the peak level holding part, the peak level of the image signal supplied from the light receiving part to the quantization part being used as a reference voltage for the quantization part to convert the image signal into digital information, and a switching part for turning the peak level holding part OFF to stop detection and storing of the peak level of the incoming signal for a prescribed time period between a time the white reference signal is received by the light receiving part from the white reference plate and a time the original sheet is transported to the first position along the transport path, so that the peak level holding part during the prescribed time period receives no signal from the light receiving part. According to the present invention, it is possible to prevent the light receiving part from receiving an abnormal level of the image signal due to regular reflection of light at a leading edge of the original sheet, and it is possible to quantize the image signal accurately into digital information, because the peak level holding circuit is not in operation, or the light source is turned OFF, continuously for a prescribed time period between a time the white reference signal is received by the light receiving part and a time the leading edge of the original sheet reaches the reading position.

Other objects and further features of the present invention will be apparent from the following detailed description when read in conjunction with the accompanying drawings.

BRIEF DESCRIPTION OF THE DRAWINGS

FIG. 2 is a diagram showing the waveform of a signal at several points indicated in the image data reading apparatus shown in FIG. 1;

FIGS. 3A and 3E are timing charts for explaining the operation of the image data reading apparatus shown in FIG. 1; and FIGS. 4A through 4E are timing charts for explaining the operation of another embodiment of an image data reading apparatus according to the present invention.

DESCRIPTION OF THE PREFERRED EMBODIMENTS

Figure 1:
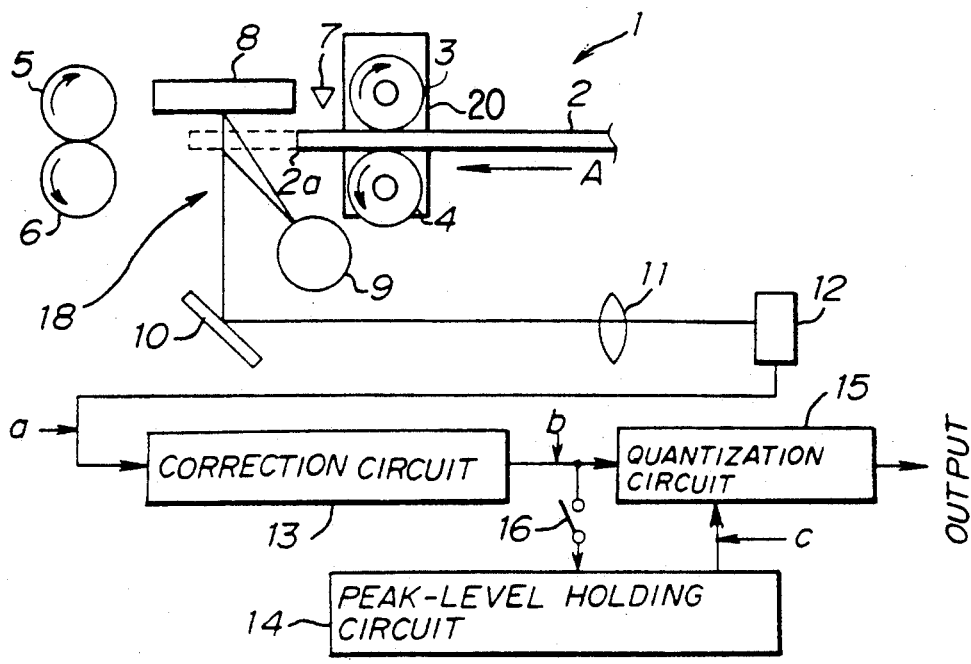
FIG. 1 is a view showing the construction of an embodiment of an image data reading apparatus according to the present invention.
Figure 1:
Figure 1:
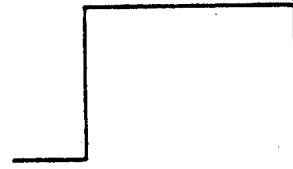
Figure 1:
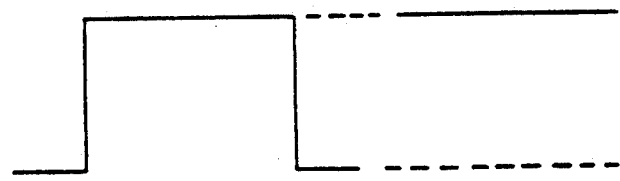

First, a description will be given of an embodiment of an image data reading apparatus according to the present invention, with reference to FIGS. 1 and 2. As shown in FIG. 1, an image data reading apparatus 1 according to the present invention generally has a pair of transport rollers 3, 4 for transporting an original sheet 2 to a reading position 18 along a transport path A within the image data reading apparatus, a pair of ejection rollers 5, 6 for ejecting the original sheet 2 after image information of the original sheet 2 is read, a position sensor 7 for sensing a position of the original sheet 2 transported along the transport path A relative to the reading position 18, a white reference plate 8 provided at the reading position 18 on an opposite side of the front surface of the original sheet 2, a light source 9 for projecting a light to the original sheet 2 and to the white reference plate 8, a mirror 10, a lens 11, a light receiving part 12, a correction circuit 13, a peak level holding circuit 14, a quantization circuit 15, and a switch 16. The transport rollers 3, 4 are driven by a stepper motor 20 to transport the original sheet 2 along the transport path A through the reading position 18. The ejection rollers 5, 6 are driven to eject the original sheet 2 out of the image data reading apparatus 1. A position of the original sheet 2 transported along the transport path A relative to the reading position 18 is sensed by the position sensor 7. A reflected light from the white reference plate 8 is converted by the light receiving part 12 into a white reference signal, and this white reference signal is supplied to the quantization circuit 15.

A light from the light source 9 is projected to the original sheet 2 or to the white reference plate 8, and a reflected light from the original sheet 2 or a reflected light from the white reference plate 8 is supplied to the light receiving part 12 via the mirror 10 and the lens 11. When the light receiving part 12 receives such an incoming light from the original sheet 2, the light is converted by the light receiving part 12 into an analog image signal, and when the light receiving part 12 receives an incoming light reflected from the white reference plate 8, the light is converted into an analog white reference signal which is, for example, as indicated in FIG. 2A, (corresponding to a signal at a point "a" shown in FIG. 1). This light receiving part 12 comprises, for example, a plurality of charge coupled devices (CCD) which are aligned along a main scanning line in which the light from the light source is scanned over the original sheet 2. With these charge coupled devices, an analog signal for each of picture elements making up an image information is produced from the incoming light into the light receiving part 12. The correction circuit 13 corrects the analog image signal obtained from the original sheet 2 based on the white reference signal from the white reference plate 8 and supplies a corrected analog image signal, as indicated in FIG. 2B, (corresponding to a signal at a point "b" shown in FIG. 1). The peak level holding circuit 14 detects and stores the peak level of an analog signal from the correction circuit 13 or the peak level of an analog signal through the correction circuit 13 before correction. The peak level holding circuit 14 supplies a signal indicative of the stored peak level, which gives a reference voltage used for the quantization circuit 15 to quantize the image signal into digital information. This signal which is supplied from the peak level holding circuit 14 to the quantization circuit 15 is, for example, as indicated in FIG. 2C, (corresponding to a signal at a point "c" shown in FIG. 1). The quantization circuit 15 uses this peak level as a reference voltage for converting the image signal supplied from the correction circuit 13 into digital information (usually binary code information). The quantization circuit 15 converts the analog image signal from the correction circuit 13 into digital information, based on the reference voltage obtained from the peak level holding circuit 14. The switch 16 provided between the correction circuit 13 and the peak level holding circuit 14 is turned on and off in accordance with an operating condition which will be described below. The above described component parts of the image data reading apparatus are all controlled by a control part which is not shown in the drawings.

Next, a description will be given of the operation of the image data reading apparatus 1 according to the present invention, with reference to FIGS. 3A through 3E. According to the present invention, the light source 9 is turned OFF continuously from a time the light receiving part 12 receives the white reference signal to a time the original sheet 2 is transported to a position where a starting line of the image information of the original sheet 2 reaches the reading position 18 within the image data reading apparatus 1. Reading the image information from the original sheet 2 is started from this starting line of the image information after the light receiving part 12 receives the white reference signal.

FIGS. 3A through 3E are timing charts for explaining the operation of major parts of the image data reading apparatus 1. FIG. 3A shows a number of pulses of a drive signal which is transferred by a control part (not shown) within the image data reading apparatus to a stepper motor 20 for driving the transport rollers 3, 4 to transport the original sheet 2 to the reading position 18. A position of the original sheet 2 being transported along the transport path relative to the reading position 18 within the image data reading apparatus is recognized, based on the number of pulses transferred to the stepper motor 20 and on the position of the leading edge of the original sheet 2 detected by the position sensor 7. FIG. 3B shows an operating condition of the light source 9 which is turned ON and OFF in a prescribed manner as described below. FIG. 3C shows the operation of the light receiving part 12 to receive a reflected light from the white reference plate 8 and convert it into the white reference signal, which is also indicative of the operation of the peak level holding circuit 14 to store the peak level from the correction circuit 13. FIG. 3D shows an operating condition of the peak level holding circuit 14, which is also indicative of an ON/OFF state of the switch 16 provided between the correction circuit 13 and the peak level holding circuit 14. FIG. 3E shows the operation of the light receiving part 12 to receive a reflected light from the original sheet 2 and convert it into an image signal.

When the transport rollers 3, 4 start to transport the original sheet 2, the light source 9 is simultaneously turned ON to project a light to the white reference plate 8, as indicated by an arrow b1 in FIG. 3B, and the switch 16 is turned ON to make the peak level holding circuit 14 start operation, as indicated by an arrow d1 in FIG. 3D. Before the original sheet 2 reaches the reading position 18, a light from the light source 9 is projected to the white reference plate 8 and a reflected light from the white reference plate 8 is received by the light receiving part 12 so that the light received is photoelectrically converted into a white reference signal. The peak level of this white reference signal from the light receiving part 12 is stored in the correction circuit 13, as shown in FIG. 3C. This corresponds to a position of the original sheet 2 where the light receiving part 12 receives the reflected light from the white reference plate 8, and this position of the original sheet 2 transported along the transport path is indicated by a dotted line L1 in FIGS. 3A through 3E. After the peak level of the white reference signal is stored in the correction circuit 13, the light source 9 is turned OFF, as indicated by an arrow b2 in FIG. 3B. The light source 9 is placed in an "OFF" state continuously for a prescribed time period between a time the light receiving part 12 receives the white reference signal, as indicated by the arrow b2 and a time the leading edge of the original 2 reaches the reading position 18, as indicated by an arrow b3 in FIG. 3B. The position of the original sheet 2 being transported along the transport path relative to the reading position 18 is recognized by a control part based on the number of pulses of a drive signal transferred to the stepper motor 20 and on the position of the leading edge 2a of the original sheet 2 detected by the position sensor 7. After the leading edge 2a of the original sheet 2 passes through the reading position 18, the light source 9 is turned ON again, as indicated by the arrow b3 in FIG. 3B. After the light source is turned ON, the light receiving part 12 starts reading of the image information of the original sheet 2, as indicated by an arrow el in FIG. 3E. A position of the original sheet 2 transported at this instant along the transport path relative to the reading position 18 is indicated by a dotted line L2 in FIGS. 3A through 3E. The image signal, which is supplied from the light receiving part 12, is corrected by the correction circuit 13, and this corrected image signal is supplied to the quantization circuit 15. The peak level holding circuit 14 detects and holds the peak level of an image signal, and this peak level is supplied to the quantization circuit 15. The quantization circuit 15 uses the peak level supplied from the peak level holding circuit 14 as a reference voltage for converting the image signal into digital information.

Therefore, according to the present invention, it is possible to prevent the light receiving part 12 from receiving an abnormal level of regularly reflected light from the leading edge of the original sheet 2 at all times, thereby allowing accurate quantization of the image signal into digital information. This is accomplished even when the peak level holding circuit 14 is continuously in operation because the light source 9 is turned OFF continuously from a time the white reference signal is received by the light receiving part 12 to a time the leading edge 2a of the original sheet 2 passes through the reading position 18 within the image data reading apparatus 1.

Next, a description will be given of the operation of another embodiment of the image data reading apparatus according to the present invention, with reference to FIGS. 4A through 4E. In FIGS. 4A to 4E, the operation of the major parts of the image data reading apparatus 1 which is the same as the corresponding operation shown in FIGS. 3A to 3E is indicated by the same reference symbols in a similar manner, and a description thereof will be omitted. In this embodiment, simultaneously when transporting the original sheet 2 by the transport rollers 3, 4 is started, the light source 9 is turned ON as indicated by an arrow b1 in FIG. 4B, and the switch 16 is turned ON to start operation of the peak level holding circuit 14 as indicated by an arrow d1 in FIG. 4D. After the white reference signal obtained with a reflected light from the white reference plate 8 is received by the light receiving part 12 as indicated in FIG. 4C, the switch 16 is turned OFF (or, the switch being placed at an open position) to stop operation of the peak level holding circuit 14, as indicated by an arrow d2 in FIG. 4D. When the leading edge 2a of the original sheet 2 reaches the reading position 18, the switch 16 is turned ON again to restart the operation of the peak level holding circuit 14, as indicated by an arrow d3 in FIG. 4D. Therefore, while the leading edge 2a of the original sheet 2 is transported to the reading position 18, the peak level holding circuit 14 is not in operation because the switch 16 is turned OFF. As a result, it is possible to prevent an unusually high level of the image signal, due to regular reflection of light at the leading edge of the original sheet 2 from being detected by the peak level holding circuit 14, so that the image signal from the original sheet 2 is quantized into digital information in a normal manner. This can be achieved even when the light source 9 is turned ON.

Further, the present invention is not limited to the above described embodiments, and variations and modifications may be made without departing from the scope of the present invention.

What is claimed is:

1. An image data reading apparatus comprising:
   transport means for transporting a document along a transport path within the image data reading apparatus, the document carrying image information on a front surface thereof;
   a white reference plate provided at a first position in the transport path to confront an opposite side of the front surface of the document;
   a light source for generating a light being projected to the first position through which the document is transported along the transport path;
   light receiving means for photoelectricically converting a light reflected from the white reference plate into a white reference signal and for photoelectrically converting a light reflected from the document into an image signal;
   correction means for eliminating a shading from the image signal supplied by the light receiving means based on the white reference signal which is supplied by the light receiving means before the document is transported to the first position;
   peak level holding means for detecting and storing a peak level of the image signal supplied from the light receiving means to the peak level holding means through the correction means;

quantization means for converting a signal supplied from the light receiving means into digital information based on the peak level of the image signal stored by the peak level holding means, the peak level of the image signal being used as a reference voltage for the quantization means to convert the image signal into digital information; and switching means for turning the peak level holding means OFF to stop detecting and storing of the peak level of the image signal for a prescribed time period between the white reference signal is received by the light receiving means from the white reference plate and a time the document is transported to the first position along the transport path, so that the peak level holding means receives no signal from the light receiving means during said prescribed time period.

2. An apparatus according to claim 1, further comprising a position sensor for detecting a position of a leading edge of the document being transported along the transport path, and wherein said transport means comprises a drive motor and a pair of transport rollers for transporting the document to the first position along the transport path, the position of the leading edge of the document being recognized based on a predetermined number of pulses of a drive signal transferred to the drive motor and the position of the leading edge of the document detected by the position sensor.

3. An apparatus according to claim 1, wherein the switching means is provided between the correction means and the peak level holding means and is turned ON and OFF in accordance with a prescribed operating condition.

4. An apparatus according to claim 1, wherein the switching means is a switch provided between the correction means and the peak level holding means, said switch being turned ON when the transport means starts transporting the document along the transport path and the light source is turned ON, so that the peak level holding means starts detecting and storing of the peak level of the image signal.

5. An apparatus according to claim 1, wherein the switching means is a switch provided between the correction means and the peak level holding means, said switch being turned ON when a leading edge of the document is transported to a reading position in the transport path, so that the peak level holding means restarts detecting and storing of the peak level of the image signal.

* * * * *